Jan. 20, 1953   O. H. SCHMITT   2,626,308
METHOD OF MAGNETIC INVESTIGATION
Filed Aug. 7, 1944
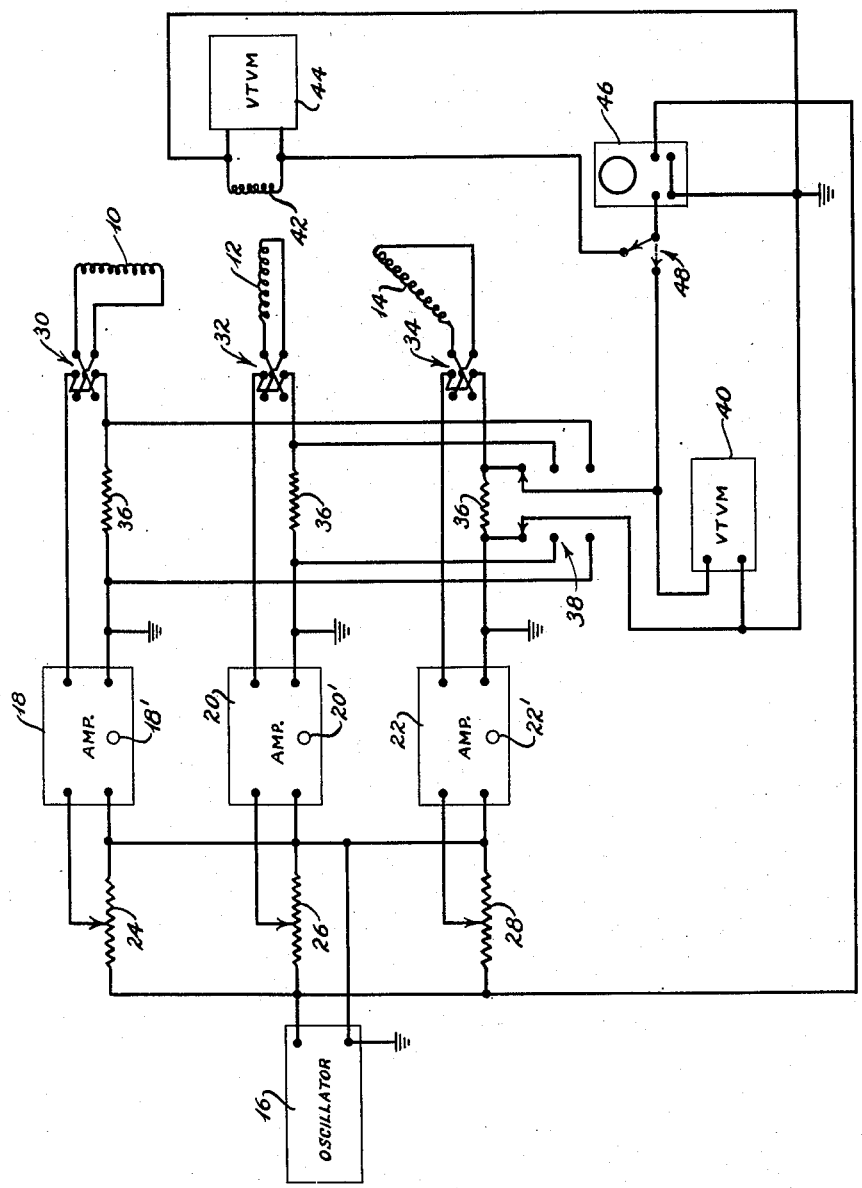
INVENTOR
Otto H. Schmitt
BY
Walter S. Paul
ATTORNEYS Patented Jan. 20, 1953

2,626,308

UNITED STATES PATENT OFFICE 2,626,308

METHOD OF MAGNETIC INVESTIGATION

Otto H. Schmitt, Port Washington, N. Y., assignor to the United States of America as represented by the Secretary of the Navy Application August 7, 1944, Serial No. 548,492

2 Claims. (Cl. 175—183)

This invention relates to methods of magnetic investigation and more particularly to methods for investigating the fields of magnetic bodies under laboratory conditions.

It is often desirable in studies of magnetic bodies to conduct laboratory investigations of the magnetic fields produced thereby. For this purpose the body to be investigated may itself be set up in the laboratory or, if it is large or unwieldy, the body may be reproduced by a scale model. It is well known that in magnetic studies a magnetic body may be replaced by a scale model if the dimensions of the model and the distribution of magnetization thereof are faithfully reproduced at the reduced scale. Under these conditions, the magnetic field produced by the model will, at all points, bear a scale relation to that of the actual body. In either case, the magnetic field produced may be measured using conventional instruments, as for example magnetometers. In a training device in which a submerged submarine is simulated for the purpose of tracking said simulation with magnetic field sensitive instruments, the known magnetic characteristics of various types of submersible craft are reproduced either in scaled models, or as in the present case, by the magnetical equivalents.

Although investigations have been carried out using the methods referred to above, difficulties are usually encountered due to interference by stray steady magnetic fields prevalent in the usual electrical laboratory. While the effects of such stray fields may be largely eliminated by magnetic shielding or through the use of neutralizing fields, such procedures are cumbersome and require the use of special equipment not always available. Another procedure involves a mathematical analysis of the measured field of the body taking into account the effects of the stray fields, but this is tedious and depends for its accuracy upon the exact determination of the stray fields.

Previous laboratory methods have the further disadvantage that, when the magnetization of the body is due principally to induced effects caused by the earth's magnetic field, investigation is limited to the field produced by the body at the particular latitude of the laboratory since the direction of the earth's magnetic field, and hence the induced effects, vary with the geographical location.

In addition, the instruments used for accurate measurement of the steady magnetic fields produced by a magnetic body are complicated and require careful operating techniques. Their use, therefore, may be disadvantageous if a large number of field determinations are to be made. Likewise, such instruments are often arranged to measure the total field and considerable difficulty is encountered in measuring the component of the field of the body to be investigated in a particular direction.

It is an object of the invention, therefore, to provide a method for investigation of the field of a magnetic body which may be used in the laboratory or under similar conditions such that the field to be measured is considerably less in intensity than the stray field existing at the same location.

It is another object of the invention to provide a magnetic field investigation method whereby the component of the magnetic field of a body in any particular direction may be measured directly.

It is a further object of the invention to provide a magnetic field investigation method which may be carried out using simple techniques and relatively simple measuring instruments.

In view of the above, the invention provides in one aspect the method of laboratory investigation of the field of a magnetic body of known magnetization which includes providing a coil array capable of producing a current distribution related to the magnetization of the body, exciting the coil array with alternating current of arbitrary amplitude, choosing a point in relation to the coil array corresponding to a point in relation to the body at which the magnetic field of the latter is known, measuring the field of the coil array at the chosen point, determining a calibration factor for the measuring device from the data thus obtained, and thereafter using the calibrated measuring device to determine the field of the coil array at the other points.

The above and other features of the invention will be described in the following detailed specification and pointed out in the appended claims.

In the drawing, the single figure is a circuit diagram of apparatus suitable for use in practicing the method of the invention.

In the practice of the method of the invention, it is assumed that the magnetization of the body to be investigated is known or may be determined. In the event that the body has been reproduced by a scale model, the magnetization of the actual body may be used since magnetization is expressed in terms of magnetic moment per unit volume. A coil array is then arranged to replace the magnetic body for the purpose of producing the magnetic field to be investigated. It is well known that the magnetic field produced by a body having any given magnetization may also be produced by means of a current distribution determinable from the given magnetization. In general, the desired current distribution may be obtained through the use of a suitable coil array which may comprise a single coil or several coils, the turns of which are distributed to produce the required current distribution. In some cases, the proper configuration of turns may be determined analytically; while in others, an experimental determination is suitable.

When the proper coil configuration is excited with direct current, a steady magnetic field scaled to that of the body to be investigated is produced. If, on the other hand, alternating current excitation is used, the field produced will be identical in direction to that of the body at every point but will have a sinusoidally varying magnitude. Thus and according to the invention, alternating current from a suitable source is used to excite the coil array, a convenient current amplitude being chosen arbitrarily. When a detection device such as a simple pickup coil is placed in the alternating magnetic field, an alternating E. M. F. is generated therein, the R. M. S., average, or peak amplitude of which may conveniently be measured by suitable means, as for example a vacuum-tube voltmeter.

According to the above, alternating-current excitation is supplied to the coil array to produce a desired current distribution. The amplitude of such excitation may be chosen arbitrarily, since it affects only the magnitude of the field produced by the array. The amplitude of the excitation to the coil array having been chosen arbitrarily, the measuring device may be calibrated as described below to read directly the strength of the field at any point in relation to the coil array.

The field produced by the body under investigation is ordinarily known or may be computed at some chosen point. The E. M. F. produced in the pickup coil by the magnetic field of the coil array simulating the body under investigation is measured at a corresponding point in relation to the coil array. The excitation to the coil may be varied arbitrarily if necessary to bring the E. M. F. to a convenient value for measurement. The E. M. F. so determined corresponds to a field strength at the chosen point and may arbitrarily be set equal to the measured field strength of the actual body to be investigated at the chosen point. Then, if field strengths are to be measured in gammas and E. M. F.'s in volts, a calibration factor in terms of gammas per volt may be obtained. After the detection device has thus been calibrated, field strengths may be read directly at any point. Thus, so long as the coil array produces a field the intensity of which at all points varies linearly with the excitation current through the array, the measuring device may be used to read directly the field at any point even though the current distribution or the magnitude of excitation current is varied. It is therefore possible, for example, to increase excitation when measuring the field at remote points and thus increase accuracy of measurement.

Inasmuch as the stray magnetic fields found in the usual electrical laboratory are essentially steady in character, they will have substantially no effect on a measuring device of the pickup-coil type so long as the measuring device is stationary in respect to the field. Thus, the only field measured by the pickup coil under these conditions is the alternating field produced by the coil array.

If the method of the invention is to be used for dynamic investigations, that is, for continuous determinations of the field strength as the measuring device is moved relatively to the field, the comparatively small E. M. F.'s generated in the measuring device as the pickup coil travels through the stray fields will be of relatively low frequency and may easily be discriminated against by means of simple selective circuits incorporated in the measuring device.

Since the earth's magnetic field is essentially a steady field, it will have no effect on the measuring device, the output of which will depend only upon the alternating field of the coil array and will be the same irrespective of the direction of the earth's field. Thus, the field of the body at any geographical location may be simulated at the laboratory merely by altering the current distribution of the coil array suitably to compensate for changes in the induced magnetization of the body which would occur if it were actually moved to a new location.

In the above, the measuring device has been referred to as being of the pickup-coil variety. Conveniently, it may comprise a simple pickup coil either with or without a core of magnetic material and a vacuum-tube voltmeter arranged to read either R. M. S. or peak values of the E. M. F. generated in the pickup coil. Since only the pickup coil of the measuring device need be moved about in making field measurements, it may easily be oriented in any desired direction in space and when so oriented will measure only the component of the field of the body in the chosen direction. Determination of the field component in any direction is, then, merely a matter of orienting the pickup coil with its axis in that direction. Resolution of the field in the chosen direction then occurs automatically.

Since the magnetic field produced by a given magnetic body at a particular point may be of either polarity depending upon the magnetization of the body, it is necessary to simulate polarity of field when the alternating-current-excited coil array is substituted for the body to be investigated. This may conveniently be done by arbitrarily letting the alternating field produced when the excitation source is connected directly to the coil array represent a steady magnetic field of one polarity. A steady field of opposite polarity is then simulated by shifting the phase of the coil excitation through 180° and letting the out-of-phase field generated represent the required steady field. The phase reversal thus required in the excitation supplied to the coil array may conveniently be effected by means of a reversing switch connected in circuit between the source of excitation and the coil array.

The "polarity" of a particular alternating field produced by the coil array may easily be determined with the pickup coil by using a cathode-ray oscilloscope to compare the phase of the E. M. F. generated in the pickup coil with that of a reference signal derived directly from the source of excitation.

In some cases, the coil array required to produce the necessary current distribution may be unduly complicated and difficult to construct as a single coil. It may be desirable, therefore, to use a plurality of coils in place of a complicated single coil to produce the desired current distribution. Such a procedure is particularly advantageous when the magnetization of the body is such that the field produced thereby may be considered to be due to a body having three resultant magnetic moments which add vectorially to produce a total magnetic moment. Thus, three coils having distributed turns, as required, may conveniently be used to reproduce the magnetic field of the body, these coils being used respectively to reproduce the field due to each of the component moments. In this case, the current excitation to the three coils must be properly phased in order to prevent generation of a gyrating field vector.

One system for use in accordance with the method of the invention is shown in the single figure of the drawing. In this case, it is assumed that the current distribution may be produced by three mutually perpendicular coils 10, 12 and 14, each having suitably distributed turns. As shown in the drawing, coil 10 is disposed vertically, coil 12 horizontally, and coil 14 perpendicularly to each of coils 10 and 12. These coils will be referred to hereafter as the vertical, horizontal and transverse coils, respectively. Excitation for the three component coils is provided by a single oscillator 16, and the frequency of excitation is chosen to minimize interference from the alternating-current power lines of the laboratory in which the field measurements are to be made.

The output of oscillator 16 is applied to the input terminals of each of three similar amplifiers 18, 20 and 22, potentiometers 24, 26 and 28 being provided to vary the signal supplied to the amplifiers. Amplifiers 18, 20 and 22 may be standard audio-frequency amplifiers having constant phase shift and means, knobs 18', 20', and 22' respectively for phase adjustment. One of these amplifiers is associated with each of the three component coils, amplifier 18 being arranged to furnish excitation to vertical coil 10, amplifier 20 to horizontal coil 12, and amplifier 22 to transverse coil 14. Double-pole, double-throw switches, 30, 32 and 34, respectively, are included in the circuits between amplifiers 18, 20 and 22 and the associated coils so that the phase of the excitation current to any of the component coils may be reversed. Thus, the output terminals of each amplifier are connected to the blade terminals of the associated switch, the fixed terminals of which are arranged as in the usual reversing switch. The component coils are connected to one set of the fixed terminals in each case.

In each case a known fixed resistor 36 is included in the circuit connecting the amplifiers to the blade terminals of the switches. Provision is made through the use of a double-pole, three-position switch 38 for connecting a vacuum-tube voltmeter 40 across any one of fixed resistors 36, thereby to permit measurement of the excitation current supplied to each of the component coils.

The field measuring device comprises a simple pickup coil 42 shown in the drawing as having a core of magnetic material, although this is not necessary, and a vacuum-tube voltmeter 44 arranged to measure the E. M. F. generated in the pickup coil. Conveniently, vacuum-tube voltmeter 44 may be arranged to read the R. M. S. value of the E. M. F. generated in the pickup coil, although other types of voltmeters may also be used. A cathode-ray oscilloscope 46 is provided for determining the "polarity" of the alternating field produced by the coil array. One set of deflecting plates of the oscilloscope may, through the use of selector switch 48, be connected either across pickup coil 42 or across the input terminals of vacuum-tube voltmeter 40. The other set of deflecting plates of the oscilloscope is connected to the output terminals of oscillator 16. Thus, it will be understood that the oscilloscope may be used to compare the phase of the excitation at the output of the oscillator with that furnished by amplifiers 18, 20 and 22 to their respective component coils 10, 12 and 14, or to compare the phase of the E. M. F. generated in pickup coil 42 with that of the excitation from oscillator 16.

In the use of the system described above, the proper distribution of turns for each of the component coils 10, 12 and 14 to reproduce the field of the body to be investigated is determined from the magnetization of the body. The oscillator is then set for any convenient output and the excitation currents supplied to each of the coils are then properly phased by comparing the phase of the current to each coil in turn with that of the oscillator output using the cathode-ray oscilloscope. For this purpose selector switch 48 is used in the position shown by the dashed lines. In accordance with one convenient procedure, the phase of the excitation current to each coil is adjusted to have the same value in respect to that of the oscillator output, thus insuring that the three coils are excited in phase. Potentiometers 24, 26 and 28 are then used to adjust the relative amplitudes of the excitation currents supplied to the three coils to produce the desired current distribution and the amplitude of excitation in each case is determined by using vacuum-tube voltmeter 40, which is connected successively by selector switch 38 across fixed resistors 36, associated with the vertical, longitudinal and transverse coils, respectively.

Each of reversing switches 30, 32 and 34 is then arbitrarily set in one of the two possible positions. Pickup coil 42 is then oriented in space until it is parallel to each of component coils 10, 12 and 14 in turn, and the phase of the E. M. F. generated in the coil is in each case compared with that of the oscillator output using the cathode-ray oscilloscope with selector switch 48 in the position shown in solid lines. Since the field polarity due to a resultant moment in a given direction may be determined from the geometry of the system, the phase relationship corresponding to that polarity may be found. Reversing switches 30, 32 and 34 are labeled accordingly and may be used thereafter to vary the current distribution in the coil array to simulate various magnetizations of the body under investigation.

Since, from the geometry of the system, the polarity of the resultant field due to the body having a total magnetic moment of known direction can be determined, the phase relationship between the output of pickup coil 42 and the output of oscillator 16 corresponding to that polarity may be found. There after the polarity of any field due to the body under investigation may be determined by comparing the phases of the two outputs used in this original determination. Vacuum-tube voltmeter 44 may then be calibrated to read field strengths directly according to the method already described above.

What is claimed is:

1. The method of investigation of the field of a magnetic body comprising the steps of substituting for said body a vertical coil, a horizontal coil, and a transverse coil each having an axis perpendicular to the others, energizing said coils with alternating currents of known amplitude and frequency, positioning a pickup coil at a point in the fields of said coils magnetically corresponding to a point of known magnetization of said body, measuring the voltage induced in said pickup coil by the fields of said other coils which is proportional to the known magnetic intensity at said point, moving said pickup coil to other positions in the field of said other coils, and measuring voltages at said other points thereby determining the magnetization pattern of said body.

2. The method of investigation of the field of a magnetic body of known magnetization comprising substituting an array of coils having intercepting fields for said body, energizing said coils with alternating currents of known frequency and amplitude, positioning a pickup coil at a point in the field of said coils corresponding in field strength and polarity with a known point of magnetization in the field of said body, measuring the voltage induced in said pickup coil at said point, moving said pickup coil through the field of said array of coils, and measuring the voltages at other points in said field thereby determining relative field strengths at points in the field of said body.

OTTO H. SCHMITT.

REFERENCES CITED

The following references are of record in the file of this patent:

UNITED STATES PATENTS

| Number | Name | Date |
|---|---|---|
| 1,297,929 | Taylor | Mar. 18, 1919 |
| 1,461,492 | Moody | July 10, 1923 |
| 1,672,328 | Loth | June 5, 1928 |
| 1,819,798 | Shimizu | Aug. 18, 1931 |
| 2,149,717 | Pearson | Mar. 7, 1939 |
| 2,266,358 | De Lanty | Dec. 16, 1941 |
| 2,412,617 | Jenkins | Dec. 17, 1946 |
| 2,428,155 | Guyod | Sept. 30, 1947 |

OTHER REFERENCES

Heiland: Geophysical Exploration; Prentice-Hall, Inc., New York; 1940; pages 19, 402–404.

Weiller: Electronics, vol. 15, May 1942, pages 52–53. 175–183–15.